US012422771B2

(12) United States Patent
Ono et al.

(10) Patent No.: US 12,422,771 B2
(45) Date of Patent: Sep. 23, 2025

(54) IMAGE FORMING APPARATUS, DIAGNOSTIC METHOD, AND NON-TRANSITORY RECORDING MEDIUM

(71) Applicants: Koichi Ono, Kanagawa (JP); Akira Uematsu, Tokyo (JP); Shinya Kamijo, Tokyo (JP)

(72) Inventors: Koichi Ono, Kanagawa (JP); Akira Uematsu, Tokyo (JP); Shinya Kamijo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/583,039

(22) Filed: Feb. 21, 2024

(65) Prior Publication Data

US 2024/0288815 A1 Aug. 29, 2024

(30) Foreign Application Priority Data

Feb. 27, 2023 (JP) ................................ 2023-028316

(51) Int. Cl.
*G03G 15/00* (2006.01)

(52) U.S. Cl.
CPC ..... *G03G 15/5058* (2013.01); *G03G 15/5016* (2013.01); *G03G 15/55* (2013.01); *G03G 2215/00409* (2013.01)

(58) Field of Classification Search
CPC .......... G03G 15/5054; G03G 15/5058; G03G 15/55; G03G 15/6558; G03G 15/6561; G03G 15/6564; G03G 15/6567; G03G 2215/00396–00409
See application file for complete search history.

(56) References Cited

U.S. PATENT DOCUMENTS

2011/0097096 A1* 4/2011 Sueoka .............. G03G 15/1605 399/302
2012/0328318 A1 12/2012 Ogiso et al.
2016/0121626 A1 5/2016 Masunaga et al.
2018/0095390 A1 4/2018 Uchida et al.
2022/0397851 A1* 12/2022 Takenaka .......... G03G 15/5025

FOREIGN PATENT DOCUMENTS

JP 2006-030451 A 2/2006
JP 2014-047071 A 3/2014
JP 2016-088748 A 5/2016

* cited by examiner

*Primary Examiner* — Carla J Therrien
(74) *Attorney, Agent, or Firm* — IPUSA, PLLC

(57) ABSTRACT

An image forming apparatus includes processing circuitry and a sensor. The processing circuitry controls formation of an image of an evaluation pattern on a transfer object. The sensor measures the image of the evaluation pattern formed on the transfer object. The processing circuitry presents a determination result of a cause of a failure based on a comparison between a reference value serving as a reference of the evaluation pattern and a measured value of the image of the evaluation pattern by the sensor.

8 Claims, 7 Drawing Sheets

FIG. 6

| PAPER FEED STAGE | CASE 1 | CASE 2 | CASE 3 | CASE 4 |
|---|---|---|---|---|
| PAPER OUTPUT FROM FIRST PAPER FEED TRAY | MISALIGNMENT PRESENT | NO MISALIGNMENT | NO MISALIGNMENT | NO MISALIGNMENT |
| PAPER OUTPUT FROM SECOND PAPER FEED TRAY | MISALIGNMENT PRESENT | MISALIGNMENT PRESENT | NO MISALIGNMENT | MISALIGNMENT PRESENT |
| PAPER OUTPUT FROM THIRD PAPER FEED TRAY | MISALIGNMENT PRESENT | MISALIGNMENT PRESENT | MISALIGNMENT PRESENT | NO MISALIGNMENT |
| PAPER OUTPUT FROM FOURTH PAPER FEED TRAY | MISALIGNMENT PRESENT | MISALIGNMENT PRESENT | NO MISALIGNMENT | MISALIGNMENT PRESENT |
| LOCATION OF DEFECT | REGISTRATION ROLLER | CONVEYANCE ROLLER OF SECOND PAPER FEED TRAY | CONVEYANCE ROLLER OF THIRD PAPER FEED TRAY | CONVEYANCE ROLLERS OF SECOND AND FOURTH PAPER FEED TRAYS |

IMAGE FORMING APPARATUS, DIAGNOSTIC METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2023-028316, filed on Feb. 27, 2023, in the Japan Patent Office, the entire disclosure of which is hereby incorporated by reference herein.

BACKGROUND

Technical Field

Embodiments of the present disclosure relate to an image forming apparatus, a diagnostic method, and a non-transitory recording medium.

Related Art

When a print position misalignment occurs in a printed material of an image forming apparatus, a customer engineer identifies which area has a fault. This results in a longer downtime for users, as it takes time to identify the cause and, in the meantime, the function related to the repaired area is not usable.

Typically, the customer engineer prints out on a sheet of paper from each sheet feed tray of the image forming apparatus and checks whether a misalignment has occurred in the printed material. When there is a misalignment, the customer engineer replaces a paper feed roller in a specific paper feed stage where the misalignment has occurred. On the other hand, when there is no misalignment, the customer engineer checks an intermediate transfer belt and a conveyance roller to handle with the print position misalignment and, when identifying a faulty part, replaces that component. As described above, when a position misalignment occurs, a customer engineer seeks the cause through trial and error to determine whether the cause exists in writing, a conveyance path, or a paper feed roller. Repeated trial and error results in a longer time for repair.

SUMMARY

According to an embodiment of the present disclosure, an image forming apparatus includes processing circuitry and a sensor. The processing circuitry controls formation of an image of an evaluation pattern on a transfer object. The sensor measures the image of the evaluation pattern formed on the transfer object. The processing circuitry presents a determination result of a cause of a failure based on a comparison between a reference value serving as a reference of the evaluation pattern and a measured value of the image of the evaluation pattern by the sensor.

According to another embodiment of the present disclosure, a diagnostic method for an image forming apparatus includes forming, measuring, and presenting. The forming forms an image of an evaluation pattern on a transfer object. The measuring measures, with a sensor, the image of the evaluation pattern formed on the transfer object. The presenting presents a determination result of a cause of a failure based on a comparison between a reference value serving as a reference of the evaluation pattern and a measured value of the evaluation pattern by the sensor.

According to still another embodiment of the present disclosure, a non-transitory recording medium stores program code which, when executed by one or more processors of an image forming apparatus, causes the one or more processors to perform a method. The method includes forming, measuring, and presenting. The forming forms an image of an evaluation pattern on a transfer object. The measuring measures, with a sensor, the image of the evaluation pattern formed on the transfer object. The presenting presents a determination result of a cause of a failure based on a comparison between a reference value serving as a reference of the evaluation pattern and a measured value of the evaluation pattern by the sensor.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a table illustrating the correspondence relationship between print results in the diagnostic method according to the embodiment of the present disclosure and the components that are assumed to have a defect.

Figure 1:
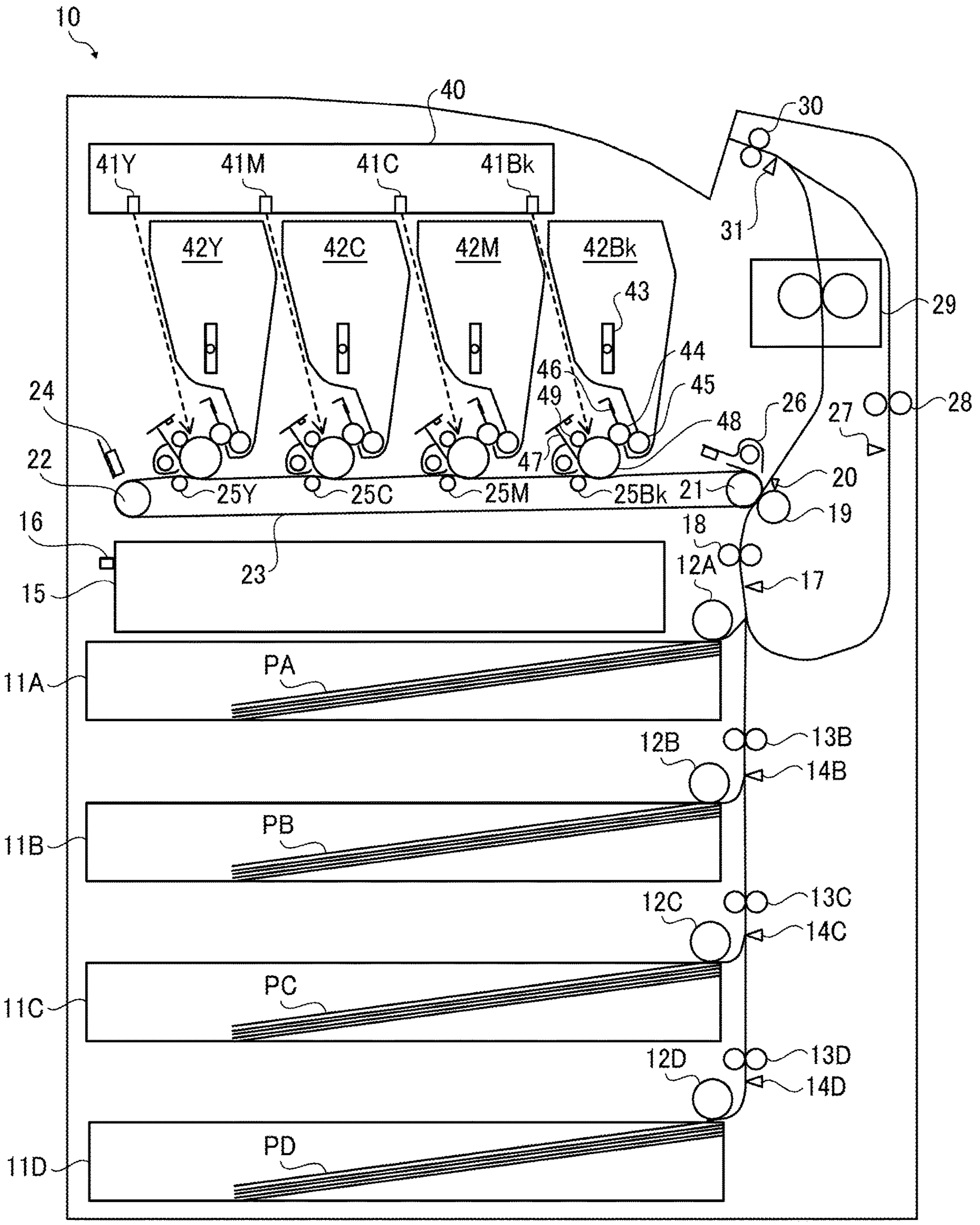
FIG. 1 is a diagram illustrating a configuration of a printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure will be described below in detail with reference to the drawings, but the embodiments of the present disclosure are not limited to the specific embodiments described. Various changes and modifications may be made to the embodiments of the present disclosure.

According to at least one embodiment of the present disclosure, there is provided an image forming apparatus including means for identifying the cause of a print position misalignment. The image forming apparatus includes a control unit that controls formation of an image of an evaluation pattern on a transfer object, a sensor that measures the image of the evaluation pattern formed on the transfer object, and a result presentation unit that presents a determination result of a cause of a failure based on a comparison between a reference value serving as a reference of the evaluation pattern and a measured value of the image of the evaluation pattern by the sensor.

The above configuration makes it possible to identify the cause of the print position misalignment in the image forming apparatus and thus reduce the downtime.

According to one or more embodiments, when there is a difference in the measured value beyond an acceptable range from the reference value, the determination result indicates that the cause exists in writing or transfer. Here, according to an embodiment, the determination result presents the message indicating that the cause exists in writing or transfer, a parameter for writing or transfer related to the print position misalignment, or both the message and the parameter.

According to one or more embodiments, when there is no difference in the measured value beyond the acceptable range from the reference value, the control unit controls execution of printing of a second evaluation pattern on a transfer material supplied from each of one or more supply units. A position misalignment beyond the acceptable range in some of print results of the second evaluation pattern printed on the transfer material supplied from each of the one or more supply units indicates that the cause exists in any one or more of the one or more supply units. A position misalignment beyond the acceptable range in a plurality of (for example, uniformly in all) print results of the second evaluation pattern printed on the transfer material supplied from each of the one or more supply units indicates that the cause exists in a conveyance path downstream from the one or more supply units in a direction in which the transfer material is supplied. The transfer material is a sheet of paper according to a certain embodiment.

According to an embodiment, the transfer object is a transfer belt, and the sensor includes a primary transfer sensor that measures an image primarily transferred to the transfer belt and a secondary transfer sensor that measures an image secondarily transferred from the transfer belt. According to this certain embodiment, the determination result indicates that the cause exists before primary transfer or in secondary transfer based on a result of a comparison of the primary transfer sensor and a result of a comparison of the secondary transfer sensor. More specifically, when there is a difference in the measured value beyond the acceptable range from the reference value as a result of the comparison of the primary transfer sensor, the determination result indicates that the cause exists before primary transfer, i.e., in primary transfer or writing. Conversely, when there is no difference in the measured value beyond the acceptable range from the reference value as a result of the comparison of the primary transfer sensor while there is a difference in the measured value beyond the acceptable range from the reference value as a result of the comparison of the secondary transfer sensor, the determination result indicates that the cause exists in neither primary transfer nor writing, but exists in secondary transfer. With this configuration, when the determination result of the cause of the failure is presented, it is possible to further differentiate the cause of the failure in either the secondary transfer or the process (writing or primary transfer) before the secondary transfer and further reduce the downtime.

According to the other embodiment, formation of the image of the evaluation pattern may start in response to entry to a diagnostic mode, and the result presentation unit may display the determination result on a display device included in the image forming apparatus.

According to at least one embodiment of the present disclosure, a diagnostic method for an image forming apparatus is further provided. The diagnostic method includes forming an image of an evaluation pattern on a transfer object. The diagnostic method further includes, with a sensor, measuring the image of the evaluation pattern formed on the transfer object. The diagnostic method further includes presenting a determination result of a cause of a failure based on a comparison between a reference value serving as a reference of the evaluation pattern and a measured value of the evaluation pattern by the sensor.

According to at least one embodiment of the present disclosure, a program for achieving the above-described image forming apparatus is further provided. The program causes a processor of the image forming apparatus to perform a method including: forming an image of an evaluation pattern on a transfer object; measuring, with a sensor, the image of the evaluation pattern formed on the transfer object; and presenting a determination result of a cause of a failure based on a comparison between a reference value serving as a reference of the evaluation pattern and a measured value of the evaluation pattern by the sensor.

With reference to the drawings, an image forming apparatus and a diagnostic method for the image forming apparatus according to an embodiment of the present disclosure will be described below in detail by using, as an example, a printer having a mode for implementing the diagnostic method to identify the cause of a print position misalignment. However, the image forming apparatus and the diagnostic method according to the present embodiment are not limited to the printer and the diagnostic method thereof, but may be applied to other devices having an image forming function, such as copiers, printers, facsimiles, and multifunctional peripherals having these multiple functions.

With reference to FIGS. 1 to 6, an image forming apparatus and a diagnostic method thereof according to the present embodiment will be described below in more details by using a printer 10 and its operation in a diagnostic mode as an example.

FIG. 1 is a diagram illustrating a configuration of the printer 10 according to the present embodiment. As illustrated in FIG. 1, the printer 10 has a configuration in which all in one (AIO) cartridges 42Bk, 42M, 42C, and 42Y of the respective colors, black (Bk), magenta (M), cyan (C), and yellow (Y), are arranged side by side along a transfer belt 23.

The printer 10 illustrated in FIG. 1 is what is called a tandem electrophotographic full-color laser printer. The tandem electrophotographic full-color laser printer is one example to which a diagnostic function according to the present embodiment is applicable, and the diagnostic function according to the present embodiment is also applicable to image forming apparatuses other than tandem type such as four-cycle systems, image forming apparatuses other than full color, such as monochrome color, mono-color, and single color, and may be applicable to image forming apparatuses other than electrophotographic systems.

In the configuration illustrated in FIG. 1, the transfer belt 23 rotates counterclockwise, and the AIO cartridges 42Bk, 42M, 42C, and 42Y are sequentially arranged in the order of black, magenta, cyan, and yellow, starting from the upstream side in the rotation direction. The AIO cartridges 42Bk, 42M, 42C, and 42Y have the common internal configuration, and the like, except that the colors of toner images to be formed are different. The AIO cartridge 42Bk forms black images, the AIO cartridge 42M forms magenta images, the AIO cartridges 42C forms cyan images, and the AIO cartridge 42Y forms yellow images. Each of the AIO cartridges 42 includes a paddle 43.

In the following description, the AIO cartridge 42Bk is described in detail with a focus on, and the reference numerals are omitted in FIG. 1 for the AIO cartridges 42C, 42B, and 42Y in other colors, and their descriptions are also omitted below. It is assumed that the description for the AIO cartridge 42Bk is applied to the other AIO cartridges 42M, 42C, and 42Y.

The transfer belt 23 is an endless belt wound around a rotationally driven secondary transfer drive roller 21 and a transfer belt tension roller 22. The secondary transfer drive roller 21 is rotated and driven by a drive motor. The drive motor, the secondary transfer drive roller 21, and the transfer belt tension roller 22 serve as a drive means that moves the transfer belt 23. The transfer belt 23 forms a transfer object according to the present embodiment. A TM sensor 24 is provided near the transfer belt tension roller 22, and the TM sensor 24 is a reflective sensor that measures the density of a pattern formed on the transfer belt 23 and acquires density balance and color positioning information.

An image forming unit, in which the AIO cartridges 42 are arranged, includes an exposure device 41, a photosensitive drum 48 as a photoconductor (image carrier), a developing device 44 arranged around the photosensitive drum 48, a supply roller 45, a developing blade 46, a cleaner blade 47, and a charging device 49. The exposure device 41 is configured to emit the laser beam that is the exposure light corresponding to the image color formed by each of the AIO cartridges 42Bk, 42M, 42C, and 42Y.

During image formation, the outer periphery surface of the photosensitive drum 48 is uniformly charged by the charging device 49 in the dark, and then exposed to the laser beam corresponding to the black image from the exposure device 41, and thus an electrostatic latent image is formed on the outer periphery surface of the photosensitive drum 48. The developing device 44 develops the electrostatic latent image as a visible image with black toner, and thus a black toner image is formed on the photosensitive drum 48. The toner image is transferred onto the transfer belt 23 by the action of the primary transfer roller 25 at the position (primary transfer position) where the photosensitive drum 48 and the transfer belt 23 are in contact with each other. This primary transfer creates an image with black toner on the transfer belt 23. The photosensitive drum 48, whose transfer of the toner image is completed, waits for the subsequent image formation after the unnecessary residual toner on the outer periphery surface is removed by the cleaner blade 47.

As described above, the transfer belt 23, to which the black toner image is transferred in the AIO cartridge 42Bk, is conveyed to the subsequent AIO cartridge 42M. In the AIO cartridge 42M, a magenta toner image is formed on the photosensitive drum 48 by the process similar to the image forming process in the AIO cartridge 42Bk. The toner image is superimposed and transferred on the black toner image formed on the transfer belt 23. The transfer belt 23 is further conveyed to the subsequent AIO cartridges 42C and 42Y, and cyan and yellow toner images formed on photosensitive drums 48C and 48Y are sequentially superimposed and transferred onto the transfer belt 23 by the same operation. Accordingly, a full-color image is formed on the transfer belt 23. The transfer belt 23, on which the full-color superimposed image is formed, is conveyed to the position of the secondary transfer drive roller 21.

In the case of printing (monochrome printing) using black toner, a primary transfer roller 25M, a primary transfer roller 25C, and a primary transfer roller 25Y are moved away from a photosensitive drum 48M, the photosensitive drum 48C, and the photosensitive drum 48Y, respectively, during image formation. The above-described image forming process is then performed for black.

During the paper conveyance operation at the time of image formation, sheets of paper PA stored in a paper feed tray 11A as a supply unit is sequentially fed by driving and rotating a paper feed roller 12A counterclockwise, starting from the sheet of paper PA on top, and waits at the position of a registration roller 18. The drive of the registration roller 18 is started at a timing such that the positions of the toner image and the sheet of paper PA overlap on the secondary transfer roller 19 and the toner image conveyed by the transfer belt 23 above. At this time, the registration roller 18 is rotated and driven in a counterclockwise direction to feed the sheet of paper PA. Paper feed rollers 12B, 12C, and 12D and conveyance sensors 14B, 14C, and 14D are installed in second to fourth paper feed trays 11B to 11D, respectively.

Since these functions are identical, their description is omitted. The sheet of paper P delivered by the registration roller 18 receives transfer of the toner image on the transfer belt 23 by the secondary transfer roller 19, then the toner image is fixed by heat and pressure in the fixing device 29, and the sheet of paper P is discharged outside the printer 10 by a paper discharge roller 30, which is rotated and driven counterclockwise. Although the configuration with the four paper feed trays 11A to 11D is illustrated in the example, the number of the paper feed trays 11 is not particularly limited, and may be one or more and less than four, or may be five or more.

When double-sided printing is performed, the paper discharge roller 30 is driven and rotated clockwise before the sheet of paper P passes through the paper discharge roller 30, and the sheet of paper P is conveyed to a double-sided conveyance path. The sheet of paper P conveyed to the double-sided conveyance path is conveyed through a double-sided roller 28 and again to the registration roller 18. The sheet of paper P having reached the registration roller 18 is again fed from the registration roller 18, and after receiving transfer of the toner image on the side opposite to the above side from the secondary transfer roller 19, the toner image is fixed by heat and pressure in the fixing device 29, and then the sheet of paper P is discharged outside the printer 10 by the paper discharge roller 30 driven and rotated counterclockwise.

After completing the secondary transfer of the toner image, the surface of the transfer belt 23 is cleaned by the belt cleaner 26 to remove any residual toner on the surface of the transfer belt 23. Waste toner generated from the formation of toner images in each color and waste toner discharged from the belt cleaner 26 are collected in a waste toner collection container 15. A waste toner full detection sensor 16 detects that the waste toner collected in the waste toner collection container 15 has reached a certain capacity.

The printer 10 according to the present embodiment further includes a secondary transfer photosensor 20 that reads the image on the secondary transfer roller 19 to identify the cause of the above-described print position misalignment. The toner transferred on the secondary transfer roller may be removed and cleaned by a cleaner blade provided in contact with the secondary transfer roller 19 (on the rear side of the secondary transfer photosensor 20) in the same manner as the cleaner blade 47 after image reading.

In an operation during diagnosis, first, a toner image of a predetermined evaluation pattern is formed on the transfer belt 23 to identify the cause of the print position misalignment without conveying any sheets of paper PA to PD stored in the paper feed trays 11A to 11D. The toner image of the evaluation pattern conveyed by the transfer belt 23 is delivered to the secondary transfer position by the secondary transfer drive roller 21 and the secondary transfer roller 19, the image on the secondary transfer roller 19 is read by the secondary transfer photosensor 20, and the image of the evaluation pattern is measured. Then, based on the results of this measurement, the cause of the print position misalignment is identified. According to the present embodiment, the main object is to diagnose a print misalignment, and the predetermined pattern formed on the transfer belt 23 may be black, although it is not limited thereto.

A hardware configuration of the printer 10 is described below before a detailed description of the diagnostic function for identifying the position of the print position misalignment of the printer 10 according to the present embodiment.

Figure 2:
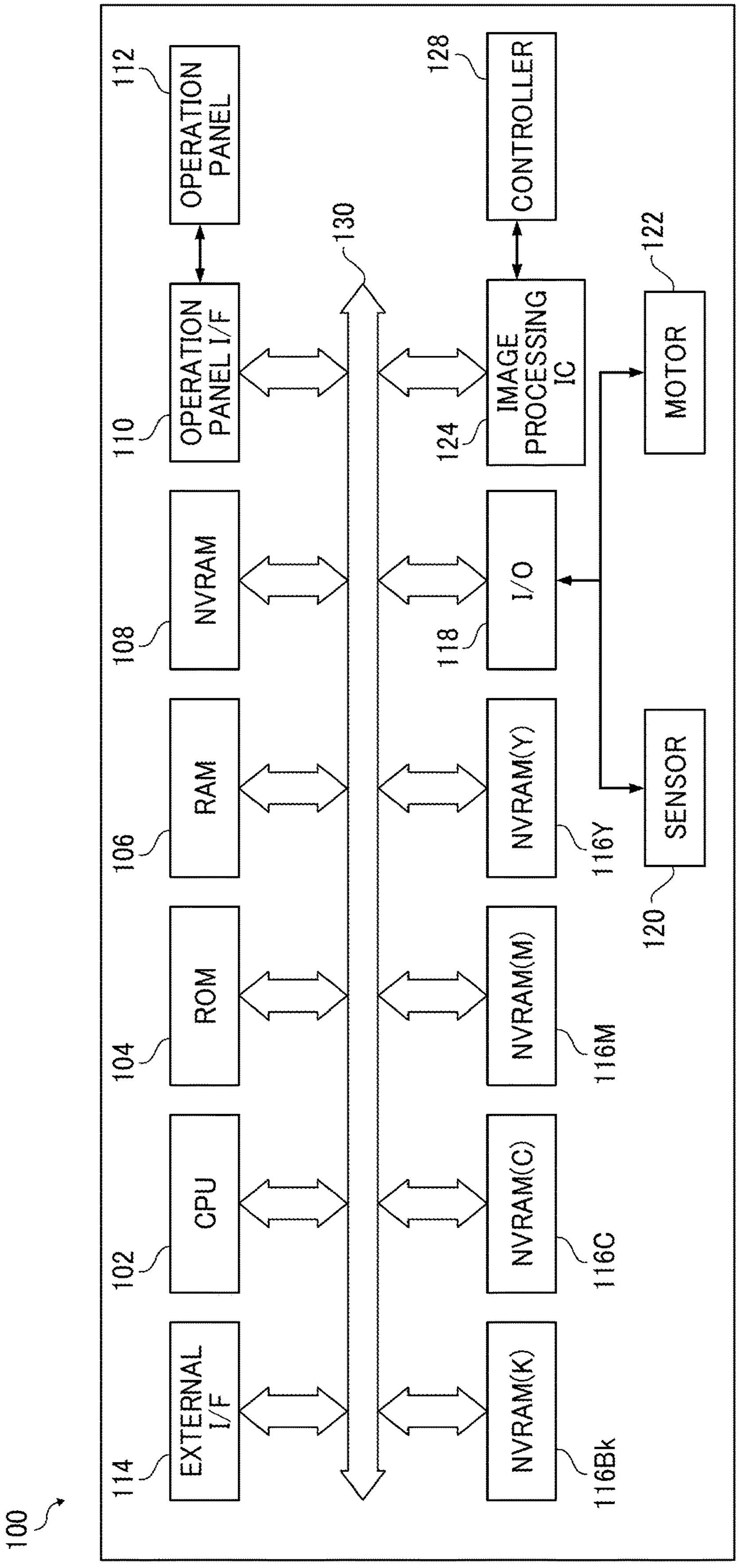
FIG. 2 is a diagram illustrating a hardware configuration of the printer according to the embodiment of the present disclosure.

FIG. 2 is a diagram illustrating a hardware configuration of the printer 10 according to the present embodiment. As illustrated in FIG. 2, the printer 10 includes a central processing unit (CPU) 102, a read only memory (ROM) 104, a random access memory (RAM) 106, a non-volatile RAM (NVRAM) 108, an operation panel interface (I/F) 110, an external I/F 114, NVRAMs (Bk, C, M, and Y) 116Bk, 116C, 116M, and 116Y, input/output (I/O) 118, and an image processing integrated circuit (IC) 124. These devices are connected to a system bus 130. The printer 10 according to the present embodiment further includes an operation panel 112 connected to the operation panel I/F 110, a sensor 120 and a motor 122 connected to the I/O 118, and a controller 128 connected to the image processing IC 124.

The CPU 102 performs overall control of the printer 10 based on a control program, and the like, stored in the ROM 104. More specifically, the CPU 102 comprehensively controls access to various devices connected to the system bus 130 and controls input/output of the sensor 120 and the motor 122 connected via the I/O 118, and other electrical components such as clutches and heaters.

The ROM 104 stores a control program, and the like, for the CPU 102 as illustrated in the flowchart below. The CPU 102 executes a control program stored in the ROM 104 and communicates with external devices such as a host computer via the external I/F 114. The RAM 106 is a memory that functions as the main memory of the CPU 102 and a work area and is used as a recorded data loading area, an environmental data storage area, etc. The NVRAM 108 stores various types of information about the printer used by the control program. The NVRAMs (Bk, C, M, and Y) 116Bk, 116C, 116M, and 116Y are mounted on the respective toner containers and store information such as the remaining amount of each toner container. The operation panel 112 connected via the operation panel I/F 110 provides a user interface to the operator. The operator may set the printer mode, and the like, via the operation panel 112.

Figure 3:
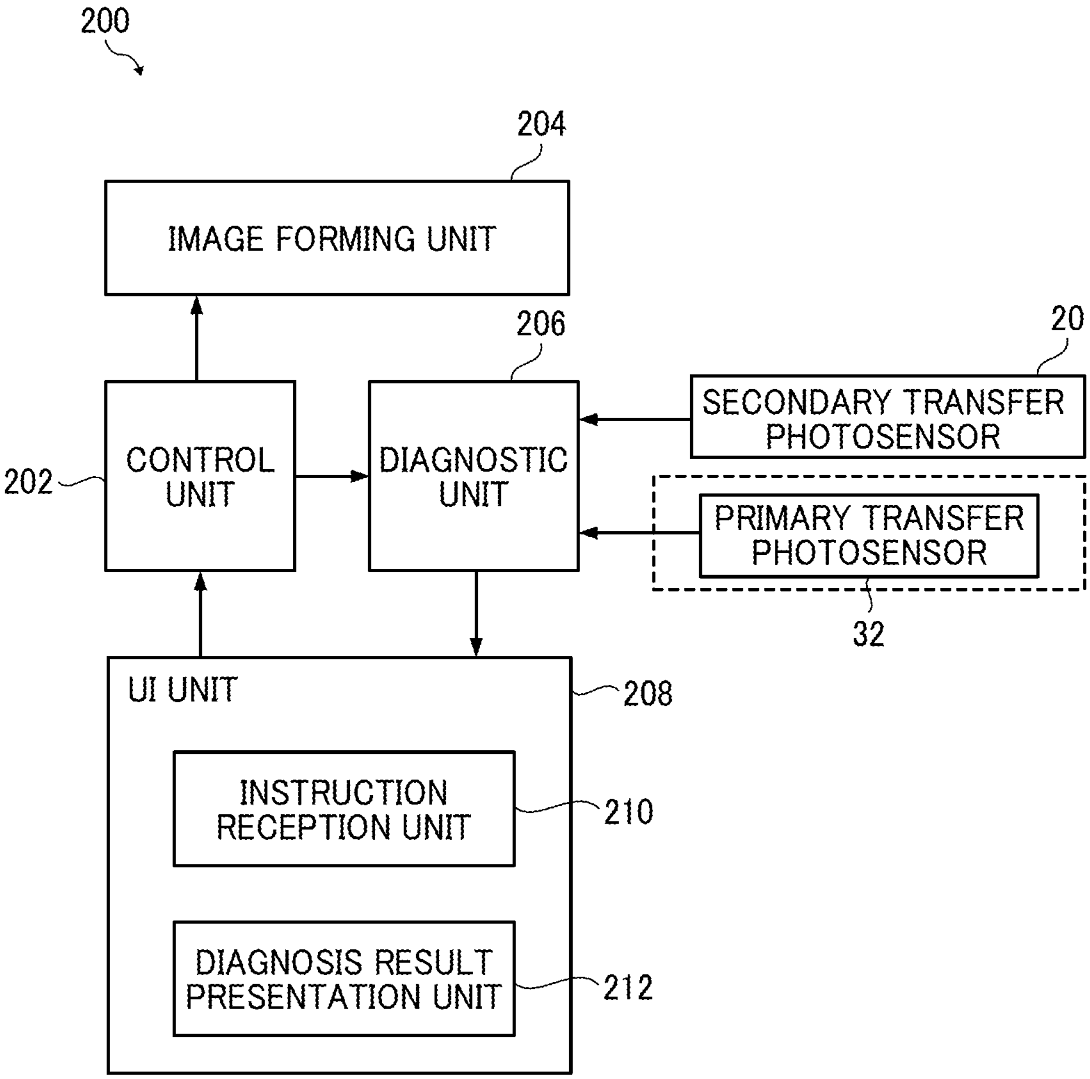
FIG. 3 is a diagram illustrating a functional configuration of the printer according to the embodiment of the present disclosure.

There is the plurality of motors 122, and each of the motors 122 is driven to feed and convey the sheet of paper and convey the image formed on the transfer belt 23. The sensor 120 is a representative of various sensors such as the registration sensor 17, the conveyance sensor 14, and the secondary transfer photosensor 20 to detect the sheet of paper and image position. The image processing IC 124 receives image data from the controller 128 and sends image data to the exposure device 41. The image processing IC 124 has the function to calculate the toner consumption amount per page from the image data received from the controller 128 and notify the CPU 102 of the calculated toner consumption amount via the system bus 130. A functional configuration 200 of the printer 10 will be continuously described below based on the functional block diagram illustrated in FIG. 3. FIG. 3 illustrates the functional configuration 200 of the printer 10 and the secondary transfer photosensor 20 as an associated hardware configuration.

The printer 10 according to the present embodiment includes, as the functional configuration 200, a control unit 202, an image forming unit 204, a diagnostic unit 206, and a user interface (UI) unit 208. More specifically, the UI unit 208 includes an instruction reception unit 210 and a diagnosis result presentation unit 212.

The control unit 202 performs control to form the toner image of the evaluation pattern for detecting a print position misalignment on the transfer belt 23. The evaluation pattern used here will be described below in detail.

As described above, according to the embodiment described, the secondary transfer photosensor 20 is used at the position of the secondary transfer from the transfer belt 23 to the sheet of paper P to measure the toner image of the evaluation pattern (toner image or evaluation pattern) on the secondary transfer roller 19 after the toner image formed on the transfer belt 23 is transferred to the secondary transfer roller 19.

The diagnostic unit 206 determines the cause of a failure based on the comparison between the reference value corresponding to the evaluation pattern (the print position serving as a reference of the pattern) and the measured value of the image of the evaluation pattern by the sensor (the actual measurement position of the pattern).

The diagnosis result presentation unit 212 presents, on the operation panel 112, the determination result including the cause of the diagnosed and identified failure. Then, the diagnosis result presentation unit 212 controls, via the control unit 202, the display of the determination result on the operation panel 112, which is a display device such as a liquid crystal display (LCD) or character display device included in the printer. The presentation of the diagnosis result presentation unit 212 may be displayed on a display device connected via a network.

The diagnosis result determined by the diagnostic unit 206 and presented by the diagnosis result presentation unit 212 will be described here. When there is a difference in the measured value of the image of the evaluation pattern beyond the acceptable range (predefined error range) from the above reference value, it means that the cause exists before the secondary transfer process, and the determination result indicates that the cause exists in writing or primary or secondary transfer as the cause before the secondary transfer process. Conversely, when there is no difference in the measured value by the above secondary transfer photosensor 20 beyond the acceptable range from the reference value although a print misalignment has occurred, there is a failure in the conveyance path or the paper feed path. However, when there are the conveyance paths, the paper feed paths, and the plurality of paper feed trays, it is difficult to differentiate any one of the paper feed paths of the paper feed trays having a failure.

Therefore, according to the preferred embodiment, when there is no difference in the measured value by the secondary transfer photosensor 20 beyond the acceptable range from the reference value, the control unit 202 gives an instruction to the image forming unit 204 to control printing execution of the evaluation pattern on the sheet of paper P supplied from each of the paper feed trays 11A to 11D. A position misalignment in the measured value beyond the acceptable range from the reference value in some of a plurality of print results of the evaluation pattern printed on the sheet of paper P supplied from each of the one or more paper feed trays 11 indicates that the cause exists in any one or more of the paper feed trays 11A to 11D. Conversely, a position misalignment in the measured value beyond the acceptable range from the reference value in all of a plurality of print results of the evaluation pattern printed on the sheet of paper supplied from each of the paper feed trays 11A to 11D indicates that the cause exists not in the paper feed trays 11A to 11D but in the common conveyance path after the paper feed trays 11A to 11D. The evaluation pattern formed on the transfer belt 23 to be measured and the evaluation pattern printed on the sheet of paper may be the same or different.

The diagnostic process by the above series of functional blocks may start, for example, in the mode for customer engineers in response to the reception of the instruction to enter the diagnostic mode to identify a print position misalignment by the instruction reception unit 210.

Figure 4:
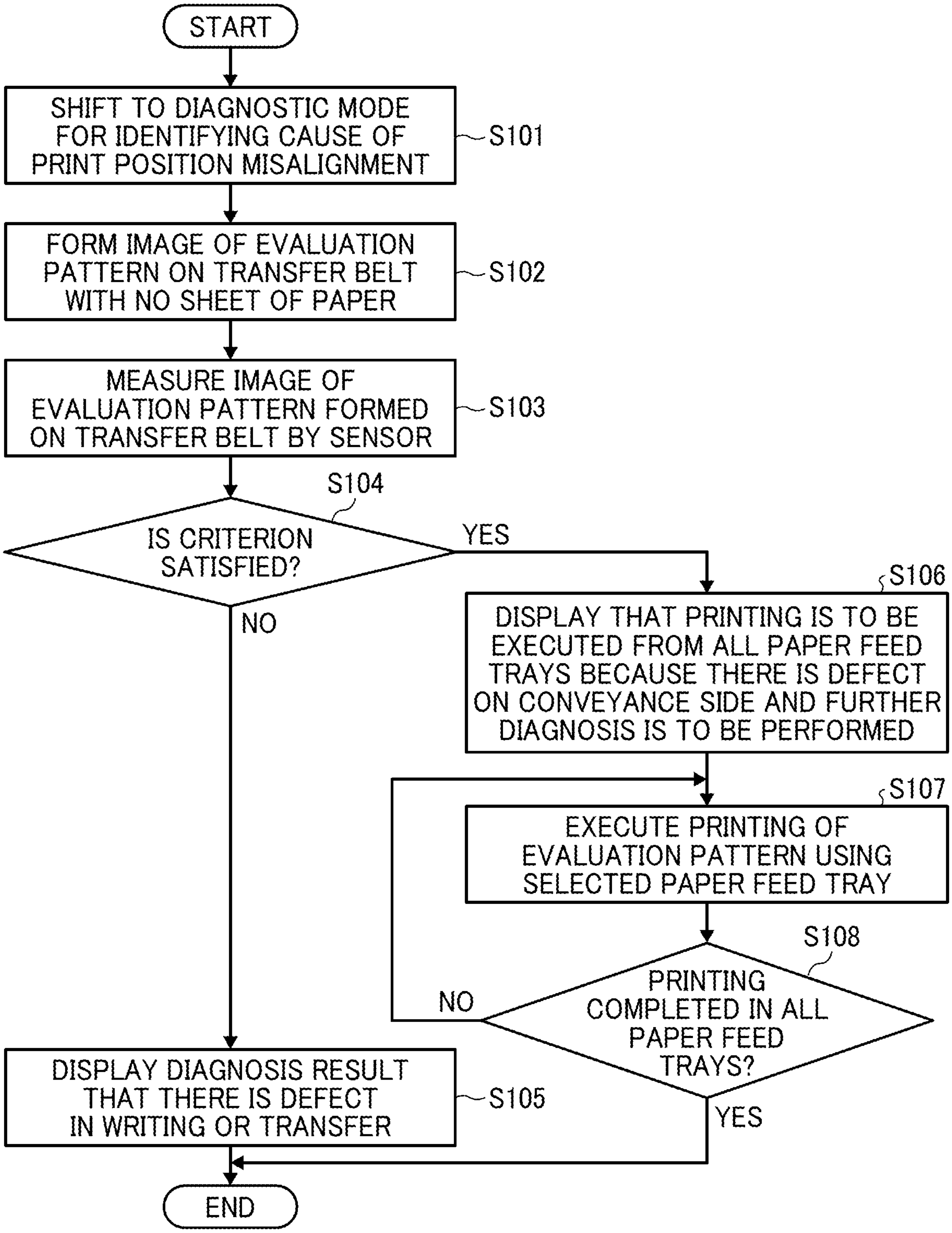
FIG. 4 is a flowchart illustrating a diagnostic method implemented by the printer according to the embodiment of the present disclosure.

FIG. 3 also illustrates the configuration according to the other embodiment, and the element (a primary transfer photosensor 32) surrounded by a dotted line is the element used in other embodiment described below. The other embodiment will be described below in detail. With reference to FIGS. 4 to 6, a diagnostic method implemented by the printer 10 according to the present embodiment will be described in more detail. FIG. 4 is a flowchart illustrating a diagnostic method implemented by the printer 10 according to the present embodiment. The process illustrated in FIG. 4 starts at Step S100, for example, in the mode for customer engineers shifted by a specific key code input in response to the reception of the instruction (e.g., selection from a menu) to enter the diagnostic mode for identifying a print position misalignment from the standby state via the operation panel 112 by the instruction reception unit 210. In Step S101, the control unit 202 (the CPU 102) shifts to the diagnostic mode for identifying the cause of the print position misalignment.

Figure 5B:
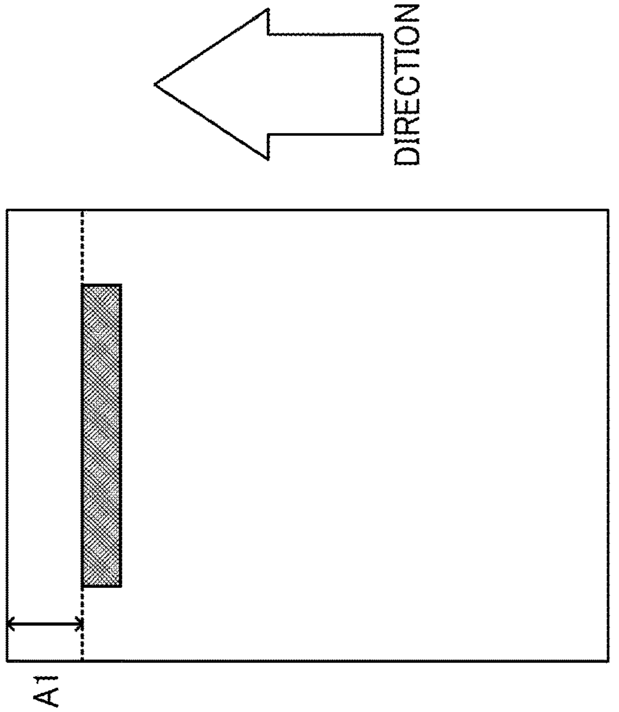
FIGS. 5A and 5B are diagrams illustrating predetermined evaluation patterns used in the diagnostic method according to the embodiment of the present disclosure.
Figure 5A:
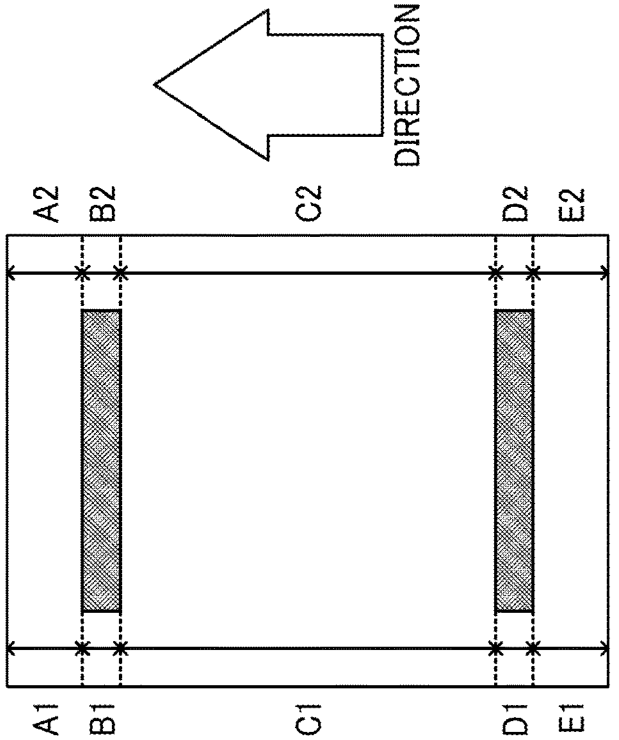

In Step S102, the control unit 202 causes the image forming unit 204 to form an image of a predetermined evaluation pattern on the transfer belt 23 with no sheet of paper. In Step S103, by the control unit 202, the image of the evaluation pattern formed on the transfer belt 23 is transferred onto the secondary transfer roller 19, and the secondary transfer photosensor 20 measures the image of the evaluation pattern. According to the embodiment described, the secondary transfer photosensor 20 measures the image on the secondary transfer roller 19 to indirectly measure the image of the evaluation pattern formed on the transfer belt 23. FIGS. 5A and 5B are diagrams illustrating the predetermined evaluation patterns used in this diagnostic method according to the present embodiment. Each of FIGS. 5A and 5B illustrates an example. The arrows of "direction" illustrated in FIGS. 5A and 5B indicate the moving direction (sub-scanning direction) on the transfer belt.

FIG. 5A illustrates patterns having solid black bands at the top and bottom of the sheet of paper, and a plurality of lengths A1, A2, B1, B2, C1, C2, D1, D2, E1, and E2 is defined in the conveyance direction. According to a certain embodiment, the reference values and the actual measurement values are compared for these lengths. According to a certain embodiment, a match may be determined when all of the above lengths fall within the acceptable range of error, and a mismatch may be determined when any one of the lengths falls outside the acceptable range.

FIG. 5B illustrates a pattern having a single solid black band, and the single length A1 is defined, which is the distance from the paper leading end to the black image in the conveyance direction. According to a certain embodiment, the reference value and the actual measurement value are compared for the length A1. According to a certain embodiment, a match may be determined when the above length A1 falls within the acceptable range of error, and a mismatch may be determined when the above length A1 falls outside the acceptable range.

The condition in FIG. 5A is stricter than that in FIG. 5B. The certain embodiment is implemented with the single length A1 in FIG. 5B, but may be implemented with FIG. 5A. FIGS. 5A and 5B are examples, and the image patterns are not limited in particular, and other image patterns may be used as long as, for example, the distance from the paper leading end to the black image in the sub-scanning direction, which is the directions of the arrows illustrated in FIGS. 5A and 5B, may be identified on the image pattern.

As described above, in Step S103 of FIG. 4, the evaluation pattern for detecting the print position misalignment is used to calculate the reference position and the actual measurement position of the image and detect an error. The description continues below, assuming that the above length A1 is 30 mm. With regard to the reference position and the actual measurement position of the image of the pattern in the above description, the reference position and the actual measurement position are measured by time, as described below. Writing in black is started with the evaluation pattern illustrated in FIG. 5B with no sheet of paper present, and (1) the actual measurement time and (2) the expectation time of the image defined below are compared.

(1) The actual measurement time: the time from the start of the detection of the secondary transfer photosensor 20 at the timing when the sheet of paper is picked from the registration roller 18 after a predetermined time from the start of black writing during normal printing to the detection of the leading end of the black band in the image pattern in FIG. 5B. (2) Expectation time: ((the distance from the registration roller 18 to the secondary transfer roller 19+the length A1) [mm]/the paper conveyance linear velocity [mm/s])+(the arc distance [mm] from the contact point between the secondary transfer drive roller 21 and the secondary transfer roller 19 to the position of the secondary transfer photosensor 20/the linear velocity [mm/s] of the secondary transfer roller 19).

In Step S104, the control unit 202 determines whether a criterion is satisfied and branches the process in accordance with the determination result. The criterion to be determined here is the criterion as to whether there is a difference in the measured value of the print position of the evaluation pattern beyond the acceptable range from the reference value of the print position. More specifically, the criterion is as to whether there is equal to or more than a certain error, e.g., in a specific example where the above length A1 is 30 mm, whether there is 0.1 mm or more as a value after distance conversion. Furthermore, for the comparison after conversion to the actual measurement time and the expectation time described above, the criterion is as to whether there is a difference of equal to or more than a predetermined time. When it is determined that the criterion is not satisfied in Step S104 (NO), the process proceeds to Step S105. In Step S105, the control unit 202 displays, on the operation panel 112, the diagnosis result that there is a defect in writing or primary or secondary transfer and terminates this diagnostic process in Step S109. When the above criterion is not satisfied as a comparison result, it is determined that there is a defect on the writing or transfer (primary transfer or secondary transfer) side. The main cause of such a defect is the occurrence of an error in the rotational speed due to a deterioration of the transfer belt 23 and the rollers. In Step S105, the message indicating that the cause exists in writing or transfer, a parameter for writing or transfer related to the print position misalignment, or both the message and the parameter may be presented. The parameters for writing or transfer related to the print position misalignment may include, but are not limited thereto, the rotational speed of the photoconductor, the conveyance speed of the transfer belt, the rotational speed of the secondary transfer roller, etc. Then, in accordance with the display, the customer engineer repairs or replaces the part related to writing or transfer, for example, the transfer belt or the rollers.

When it is determined that the criterion is satisfied in Step S104 (YES), the process branches to Step S106. When the condition is satisfied, i.e., no error beyond the acceptable range is calculated, there is no fault in both writing and transfer, and therefore it is determined that there is a fault on the conveyance side (on the conveyance path from paper feeding to discharge) in the configuration of the printer 10. In Step S106, the control unit 202 controls the diagnosis result presentation unit 212 to display, on the operation panel 112, that printing is to be executed from all the paper feed trays because there is a defect on the conveyance side and further diagnosis is to be performed.

In Step S107, the control unit 202 causes the image forming unit 204 to execute the printing of a second evaluation pattern using the sheet of paper set in the selected one among all the paper feed trays 11A to 11D.

In Step S108, the control unit 202 determines whether printing has been completed in all the paper feed trays 11. When it is determined in Step S108 that printing has not been completed in all the paper feed trays because there is a paper feed tray where printing has not been executed (NO), the subsequent paper feed tray is selected and the process loops to Step S107. Conversely, when it is determined in Step S108 that printing has been completed in all the paper feed trays (YES), the process proceeds to Step S109 to terminate this process. This allows the customer engineer to make a determination based on the print results from all the paper feed trays. The customer engineer may visually check the print positions on the sheets of paper output from all the paper feed trays or read the print positions with a reading device to identify which roller on the conveyance side has a defect. The determination method will be described below.

First, a position misalignment beyond the acceptable range in some of a plurality of print results of the evaluation pattern printed on the sheet of paper supplied from each of the paper feed trays 11A to 11D indicates that the cause exists in any one or more of the paper feed trays 11A to 11D. In such a case, it is determined that the cause exists in the conveyance roller 13 of the paper feed tray 11 where a misalignment has occurred or the paper feed roller 12 of the paper feed tray where a misalignment has occurred and the component is the target to be repaired. Conversely, a position misalignment beyond the acceptable range in all of the plurality of print results of the evaluation pattern printed on the sheet of paper supplied from each of one or more supply units indicates that the cause exists in the conveyance path (e.g., the registration roller 18) after the paper feed unit. In such a case, it is determined that the component of the conveyance path is the target to be repaired.

The evaluation pattern, which is the second evaluation pattern to be printed out, may be the same as the one illustrated in FIGS. 5A and 5B, but not limited thereto, and may be a different pattern.

FIG. 6 is a table illustrating the correspondence relationship between the print results in the diagnostic method according to the present embodiment and the components that are assumed to have a defect.

By comparing the contents of the table illustrated in FIG. 6, it is possible to identify the components on the transfer side that are assumed to have a defect. The cause of the defect is assumed to be abrasion of the rollers in the paper feed units and abrasion or damage of the conveyance roller 13 and the registration roller 18.

A determination is made as illustrated in the table of FIG. 6. When a misalignment uniformly occurs in the output sheets of paper in all the paper feed trays as compared to the reference evaluation pattern, it is considered that the registration roller 18 has a defect (Case 1). Conversely, when there is no misalignment in the first paper feed tray 11A and there are misalignments in the subsequent second paper feed tray 11B to the fourth paper feed tray 11D, the conveyance roller 13 in the second paper feed tray 11B has a defect (Case 2). When there is a misalignment in a specific paper feed tray (in one example, the third paper feed tray 11C) and no misalignment in the first paper feed tray 11A, the second paper feed tray 11B, and the fourth paper feed tray 11D, the paper feed roller 12 in the third paper feed tray 11C has a defect (Case 3). When there is a misalignment in a specific paper feed tray (in one example, the second paper feed tray 11B and the fourth paper feed tray 11D) and no misalignment in the first paper feed tray 11A and the third paper feed tray 11C, the paper feed rollers 12 in the second paper feed tray 11B and the fourth paper feed tray 11D have a defect (Case 4).

Thus, when there is a print position misalignment in the evaluation pattern on the sheets of paper in all the paper feed trays, it may be determined that a component (e.g., registration roller) after the paper feed unit is faulty. Conversely, when the print position is uniformly misaligned after a specific paper feed tray, it may be determined that the conveyance roller of the paper feed stage where the misalignment has occurred is faulty. Conversely, when there is no position misalignment after a specific paper feed tray, it may be determined that the paper feed roller in the paper feed stage where the misalignment has occurred is faulty.

The table illustrated in FIG. 6 is an example of the case where the paper feed trays at four stages are provided, and a determination may be made in the same manner as long as the paper feed trays at a plurality of stages are provided.

The above configuration presents the determination result of the cause of the failure based on the comparison between the reference value corresponding to the evaluation pattern and the measured value of the image of the evaluation pattern formed on the transfer belt 23 by the secondary transfer photosensor 20. Thus, the printer 10 may identify the cause of the print position misalignment and thus reduce the downtime.

As it is understood from FIG. 6, when there is a position misalignment beyond the acceptable range (when the presence of alignment and the absence of alignment are mixed) in some of the evaluation patterns printed on the sheet of paper supplied from each of the paper feed trays 11A to 11D, the cause exists in abrasion of the rollers in the paper feed units and, instead of measuring the single length A1 for each sheet of paper by the customer engineer or the reading device, a simple checking method using transparent sheets of paper may be used so that the sheets of paper on which the evaluation patterns are output are overlapped with each other and the sheet of paper having a print position misalignment is visually recognized and thus it is also possible to identify the location of the defect.

Figure 7:
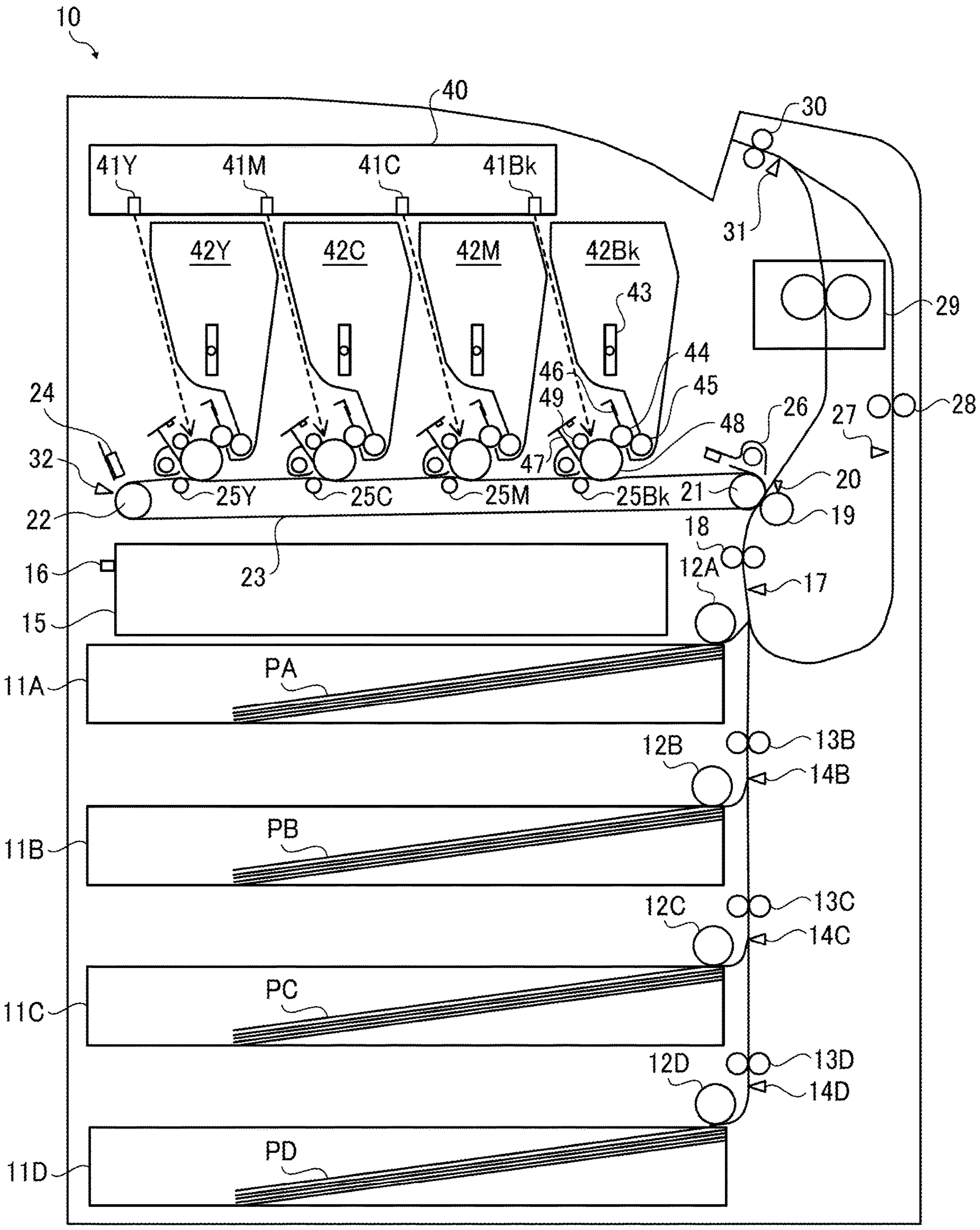
FIG. 7 is a diagram illustrating a configuration of the printer according to the other embodiment of the present disclosure.

According to the embodiment described above, the secondary transfer photosensor 20 on the secondary transfer side is used to measure the image of the evaluation pattern. This allows for the diagnosis of defects in writing or primary or secondary transfer, and it is preferable to further narrow down defects in such a diagnosis. It is possible to further differentiate a defect in either the secondary transfer process or other than the secondary transfer process (writing or primary transfer process). With reference to FIGS. 3 and 7, the other embodiment will be described below, in which when the diagnosis result of a defect in writing or primary or secondary transfer is obtained, the cause of the defect may be further differentiated. FIG. 7 is a diagram illustrating a configuration of the printer 10 according to the other embodiment. The printer 10 according to the other embodiment is also a tandem electrophotographic full-color laser printer, similar to the embodiment described with reference to FIG. 1. The following description focuses on the changes from FIG. 1.

As illustrated in FIG. 7, the printer 10 according to the other embodiment includes a primary transfer photosensor 32 that reads the image on the transfer belt 23 near the transfer belt tension roller 22 downstream from the primary transfer roller 25Y in the conveyance direction of the transfer belt 23 in order to identify the cause of the print position misalignment in more detail.

In the operation during the diagnosis, as in FIG. 1, the toner image of the predetermined evaluation pattern is first formed on the transfer belt 23 to identify the cause of the print position misalignment without conveying the sheets of paper PA to PD stored in the paper feed trays 11A to 11D. The toner image of the evaluation pattern conveyed by the transfer belt 23 is first delivered to the position of the transfer belt tension roller 22, the image on the transfer belt 23 is read by the primary transfer photosensor 32, and the image of the evaluation pattern is measured for the first time. Then, the toner image of the evaluation pattern conveyed by the transfer belt 23 is further delivered to the secondary transfer position by the secondary transfer drive roller 21 and the secondary transfer roller 19, and in the same manner as in FIG. 1, the image on the secondary transfer roller 19 is read by the secondary transfer photosensor 20, and the image of the evaluation pattern is measured for the second time. Then, the cause of the print position misalignment is identified based on the measurement results at these two positions.

The functional configuration 200 of the printer 10 according to the other embodiment will be described below again with reference to the functional block diagram illustrated in FIG. 3. FIG. 3 illustrates the configuration according to the other embodiment illustrated in FIG. 7 with the element surrounded by a dotted line as a newly added element. More specifically, in the configuration according to the other embodiment, the primary transfer photosensor 32 is illustrated.

The control unit 202 according to the other embodiment performs control to form the toner image of the evaluation pattern for detecting the print position misalignment on the transfer belt 23. According to the other embodiment, the sensor makes the measurement using the primary transfer photosensor 32 that measures the image primarily transferred to the transfer belt in addition to the secondary transfer photosensor 20 that measures the toner image of the evaluation pattern formed on the transfer belt 23 at the secondary transfer position from the transfer belt 23 to the sheet of paper P.

For both the primary transfer photosensor 32 and the secondary transfer photosensor 20, the diagnostic unit 206 determines the cause of the failure based on the comparison between the reference value (the print position serving as the reference of the pattern) corresponding to the evaluation pattern and the measured value (the actual measurement position of the pattern) of the image of the evaluation pattern by the sensor. The operation panel 112 may indicate that the cause of the failure exists in the primary transfer (and writing) or the secondary transfer.

The diagnosis result presentation unit 212 presents, on the operation panel 112, the determination result including the diagnosed cause of the failure and controls the display on the operation panel 112.

More specifically, when there is a difference in the measured value beyond the acceptable range from the reference value as a result of the comparison of the primary transfer photosensor 32, the determination result indicates that the cause exists in the primary transfer or writing. Conversely, when there is no difference in the measured value beyond the acceptable range from the reference value as a result of the comparison of the primary transfer photosensor 32 while there is a difference in the measured value beyond the acceptable range from the reference value as a result of the comparison of the secondary transfer photosensor 20, the determination result indicates that the cause exists in the secondary transfer. With this configuration, when the determination result of the cause of the failure is presented, it is possible to further differentiate the cause of the failure in either the secondary transfer or the process (writing or primary transfer) before the secondary transfer and further reduce the downtime.

According to the embodiments described above, it is possible to provide the image forming apparatus, the diagnosis method for the image forming apparatus, and the non-transitory recording medium with which it is possible to identify the cause of the print position misalignment and thus reduce the downtime for the user.

Each of the functions according to the embodiments described above may be performed by one or more processing circuitries. The term "processing circuitry" used herein includes processors programmed to perform each function by software, such as processors implemented by electronic circuitries, and devices designed to perform each function described above, such as Application Specific Integrated circuit (ASIC), digital signal processor (DSP), field programmable gate array (FPGA), and conventional circuitry modules. Any one of the above-described operations may be performed in various other ways, for example, in an order different from the one described above.

The above-described embodiments are illustrative and do not limit the present invention.

Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus, comprising:

processing circuitry configured to control formation of an image of an evaluation pattern on a transfer object; and a sensor configured to measure the image of the evaluation pattern formed on the transfer object, wherein the processing circuitry is configured to present a determination result of a cause of a failure based on a comparison between a reference value serving as a reference of the evaluation pattern and a measured value of the image of the evaluation pattern by the sensor, and wherein when there is no difference in the measured value beyond an acceptable range from the reference value, the processing circuitry is configured to control execution of printing of a second evaluation pattern on a transfer material supplied from each of one or more supply units.

2. The image forming apparatus according to claim 1, wherein when there is a difference in the measured value beyond the acceptable range from the reference value, the determination result indicates that the cause exists in writing or transfer.

3. The image forming apparatus according to claim 1, wherein a position misalignment beyond the acceptable range in some of a plurality of print results of the second evaluation pattern printed on the transfer material supplied from each of the one or more supply units indicates that the cause exists in any one or more of the one or more supply units.

4. The image forming apparatus according to claim 1, wherein a position misalignment beyond the acceptable range in a plurality of print results of the second evaluation pattern printed on the transfer material supplied from each of the one or more supply units indicates that the cause exists in a conveyance path downstream from the one or more supply units in a direction in which the transfer material is supplied from each of the one or more supply units.

5. The image forming apparatus according to claim 1, wherein the transfer object is a transfer belt, the sensor includes a primary transfer sensor to measure an image primarily transferred to the transfer belt and a secondary transfer sensor to measure an image secondarily transferred from the transfer belt, and the determination result indicates that the cause exists before primary transfer or in secondary transfer based on a result of a comparison of the primary transfer sensor and a result of a comparison of the secondary transfer sensor.

6. The image forming apparatus according to claim 1, wherein formation of the image of the evaluation pattern starts in response to entry to a diagnostic mode, and the processing circuitry displays the determination result on a display device included in the image forming apparatus.

7. A diagnostic method for an image forming apparatus, the diagnostic method comprising:

forming an image of an evaluation pattern on a transfer object;

measuring, with a sensor, the image of the evaluation pattern formed on the transfer object;

presenting a determination result of a cause of a failure based on a comparison between a reference value serving as a reference of the evaluation pattern and a measured value of the evaluation pattern by the sensor; and controlling execution of printing of a second evaluation pattern on a transfer material supplied from each of one or more supply units when there is no difference in the measured value beyond an acceptable range from the reference value.

8. A non-transitory recording medium storing program code which, when executed by one or more processors of an image forming apparatus, causes the one or more processors to perform a method, the method comprising:

forming an image of an evaluation pattern on a transfer object;

measuring, with a sensor, the image of the evaluation pattern formed on the transfer object;

presenting a determination result of a cause of a failure based on a comparison between a reference value serving as a reference of the evaluation pattern and a measured value of the evaluation pattern by the sensor; and controlling execution of printing of a second evaluation pattern on a transfer material supplied from each of one or more supply units when there is no difference in the measured value beyond an acceptable range from the reference value.

* * * * *